(12) United States Patent
Rey et al.

(10) Patent No.: US 9,161,653 B2
(45) Date of Patent: Oct. 20, 2015

(54) BEVERAGE DISPENSER WITH IMPROVED REFILLING OPERATION

(75) Inventors: Cedric Rey, La Sarraz (CH); Lucio Scorrano, Yverdon-les-Bains (CH); Albert Zsolt, Bussigny (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 14/235,347

(22) PCT Filed: Jul. 24, 2012

(86) PCT No.: PCT/EP2012/064465
§ 371 (c)(1),
(2), (4) Date: Jan. 27, 2014

(87) PCT Pub. No.: WO2013/014142
PCT Pub. Date: Jan. 31, 2013

(65) Prior Publication Data
US 2014/0166697 A1   Jun. 19, 2014

(30) Foreign Application Priority Data
Jul. 28, 2011   (EP) .................................... 11175675

(51) Int. Cl.
B67D 7/70 (2010.01)
A47J 31/40 (2006.01)
A47J 31/44 (2006.01)
B67D 1/00 (2006.01)

(52) U.S. Cl.
CPC ............ *A47J 31/404* (2013.01); *A47J 31/4403* (2013.01); *A47J 31/40* (2013.01); *A47J 31/407* (2013.01); *B67D 1/0079* (2013.01)

(58) Field of Classification Search
CPC ..... A47J 31/40; A47J 31/404; A47J 31/4403; A47J 31/41; A47J 31/4407; A47J 31/4414; A47J 31/402; A47J 31/407; B67D 1/0001; B67D 1/0004; B67D 2001/0814; B67D 2001/0818; B67D 2001/082; B67D 3/0087; B67D 1/0079
USPC ............... 222/1, 105, 129.1, 129.3, 131, 132, 222/135, 142.3, 143, 144.5, 232, 236, 222/408.5, 410–413, 502, 503, 507, 521, 222/548, 555, 574, 575, 94, 129
See application file for complete search history.

(56) References Cited

U.S. PATENT DOCUMENTS

| | | | |
|---|---|---|---|
| 4,566,287 A * | 1/1986 | Schmidt et al. | 62/188 |
| 6,062,438 A * | 5/2000 | Ellis et al. | 222/349 |
| 6,176,172 B1 | 1/2001 | Stettes | |
| 6,182,555 B1 * | 2/2001 | Scheer et al. | 99/290 |
| 7,500,635 B2 * | 3/2009 | Cooper et al. | 242/588.6 |
| 2002/0148858 A1 * | 10/2002 | Bertone | 222/129.4 |

FOREIGN PATENT DOCUMENTS

| | | |
|---|---|---|
| WO | WO0230240 | 4/2002 |
| WO | WO2009033087 | 3/2009 |

\* cited by examiner

*Primary Examiner* — Frederick C Nicolas
*Assistant Examiner* — Bob Zadeh
(74) *Attorney, Agent, or Firm* — K&L Gates LLP

(57) ABSTRACT

A beverage dispenser comprises: a housing (1), at least two refillable containers (2) for storing bulk beverage ingredients, at least a beverage preparation unit (3) operatively linked to the containers for preparing a beverage from at least one of the stored bulk beverage ingredients, a sub-housing (4) in which the containers are placed, the sub-housing being removable from the housing.

15 Claims, 11 Drawing Sheets

BEVERAGE DISPENSER WITH IMPROVED REFILLING OPERATION

CROSS REFERENCE TO RELATED APPLICATIONS

The present application is a National Stage of International Application No. PCT/EP2012/064465, filed on Jul. 24, 2012, which claims priority to European Patent Application No. 11175675.5, filed Jul. 28, 2011, the entire contents of which are being incorporated herein by reference.

FIELD OF THE INVENTION

The present invention relates to a beverage dispenser comprising means for storing and dosing a food ingredient which can be easily refilled.

BACKGROUND OF THE INVENTION

Many beverages like espresso and other coffee beverages, milk beverages, chocolate beverages, . . . are often prepared by dosing and mixing a food soluble powder with a diluent. According to one type of beverage preparation machine the food soluble powder is stored in a non disposable canister that is part of the machine and that is regularly refilled. For the refilling operation the canister is pulled out of the machine, its top is opened and powder is empty inside.

For machines preparing various beverages like e.g. coffee and milk and chocolate and tea, several canisters must be regularly refilled and it takes time to carry out the refilling of all the containers. Yet this refilling operation must be as short as possible because the dispenser is not operable for producing beverages during that time.

Once the operator has refilled one container with a powder it is also often important that the operator always replaces the same container at the same place in the dispenser. Actually in most of the machines, the containers contain dosing means (e.g. screw or spring auger at the bottom of the container) and dosing means are activated differently by the machine motors depending on the nature of the powder inside the container. Moreover each dosing means generally delivers a dose of powder to a mixer or whipper that is specifically configured for mixing or whipping that powder—e.g. a whipper for a coffee powder is differently configured from a whipper for a milk powder. If the operator does not correctly place the different containers in the machine, the beverages will not be correctly prepared and it will affect their taste.

One aim of the present invention is to solve these problems and to propose a beverage dispenser comprising several beverage powder containers that can be easily and rapidly refilled without mistake by the operator.

SUMMARY OF THE INVENTION

According to a first aspect, the invention concerns a beverage dispenser comprising:
- a housing,
- at least two refillable containers for storing bulk beverage ingredients,
- at least a beverage preparation unit operatively linked to the containers for preparing a beverage from at least one of the stored bulk beverage ingredients,
- a sub-housing in which the containers are placed, said sub-housing being removable from the housing, wherein the top of the sub-housing is configured so that it closes access to the top of the containers, and wherein each refillable container comprises a cover and a tank, the cover comprising a lid and four walls perpendicular to the lid, said walls being configured to slide along the tank walls, and wherein the height of the cover walls is greater than the distance between the top of the tank of the container and the top of the sub-housing.

The beverage dispenser of the present invention comprises a housing in which the different functional elements for preparing the beverages are positioned. In particular at least two refillable containers for storing bulk beverage ingredients are positioned in the housing. These containers are usually non disposable. They are able to store bulk beverage ingredients that are generally powders, pellets or granules. According to the preferred mode, the beverage ingredients are soluble ingredients like soluble coffee, tea, chocolate, milk, sugar, or other flavoured powders. A beverage preparation unit that prepares a beverage from at least one of the beverage ingredients is also usually positioned in the housing. The beverage preparation unit usually comprises one means for contacting the beverage ingredient with a diluent. It can be a diluent jet(s) head, a mixing bowl, a whipper bowl, a brewing chamber. The beverage preparation unit is generally positioned or operatively linked to the containers so that it can receive a dose of ingredients therefrom and subsequently put it in contact with a diluent and prepare a beverage. According to the invention the dispenser comprises a sub-housing in which the at least two refillable containers are placed. The sub-housing can be removed from the housing while the canisters are inside it. Consequently the operator can withdraw all the containers of the dispenser in only one movement.

The top of the sub-housing is configured so that it closes access to the top of the containers. In this configuration the operator cannot refill the containers without withdrawing each container from the drawer. This feature presents the advantage of limiting the cross-contamination of the bulk ingredients stored in the containers: actually, if the containers can be well separated during refilling, the risk that one ingredient flies and falls in the next container is limited. It also avoids dirtying the inside of the sub-housing during refilling. Lastly, the top of the sub-housing cooperates with the lids closing the top of the containers so that no powder can escape from the containers even if the drawer falls upside down. In particular each refillable container comprises a cover and a tank, the cover comprising a lid and four walls perpendicular to the lid. The walls are configured to slide along the tank wall and their height is greater than the distance between the top of the tank of the container and the top of the sub-housing.

According to one preferred mode the sub-housing is a drawer. This drawer is able to slide in the housing which helps the placement of the sub-housing inside the housing.

The housing can present a compartment for receiving the sub-housing. This compartment can help for supporting the sub-housing inside the machine when all the containers are refilled.

According to a preferred mode the sub-housing presents handles on its lateral walls. By lateral, it is meant the left and right sides of the machine when the operator is placed in front of it the machine. These handles help for pulling or pushing the sub-housing out or in the housing.

According to another preferred mode the sub-housing presents a handle on its top wall. Preferably this handle is retractable. In particular the handle can be folded along the sub-housing top wall near from the dispenser front side so that the operator can easily pull out the canister from the housing.

The dispenser can comprise means for locking the sub-housing in the housing. According to the embodiment in which the sub-housing presents handles on its lateral walls, the locking means can be positioned in the handles.

The sub-housing can also present guiding means complementary to housing guiding means and configured for guiding the positioning of the sub-housing in the housing during the withdrawal from or the introduction in the dispenser.

Generally the sub-housing presents holes enabling the cooperation of dosing means positioned in the containers with actuating means positioned in the dispenser.

According to the preferred embodiment each of the containers comprises:
 a tank,
 a rotatable volumetric dosing means at the bottom of the tank,
 a discharge port at the outlet of the tank.

The rotatable volumetric dosing means can be a screw auger or a spring auger. The rotatable volumetric dosing means usually longitudinally extends along the bottom of the tank. The discharge port is generally a tube that cooperates with the outlet of the tank. It is usually oriented downwards to deliver the beverage ingredient to the beverage preparation unit by gravitation. It can be vertically oriented or only inclined downwards.

According to a first mode of the invention the discharge port can be rotated. The rotation is usually made around the rotatable volumetric dosing means central axis. The sub-housing can present at least one bottom hole in which the discharge ports are able to rotate.

Preferably the rotation of a discharge port simultaneously actuates the closure of said discharge port. Actually a weir can partially obstruct the outlet of the tank and the rotatable discharge port can comprise a complementary weir so that when it is rotated the outlet of the tank is totally closed.

According to a second mode of the invention the discharge port can comprise:
 an internal delivery tube comprising a hollowing-out in its bottom part,
 an external movable means comprising a hollowing-out in its bottom part, said external movable means covering at least a part of the internal delivery tube and being movable between:
  a position in which the both hollowing-outs of the internal delivery tube and of the external movable means overlap each other, and
  a position in which the surface of the external movable means overlaps and closes the hollowing-out of the delivery tube.

The internal delivery tube of the discharge port is the outlet of the refillable container tank. It is usually a cylinder. The base of the cylinder is preferably closed near the outlet extremity. The ingredients that are delivered by the tube are evacuated by the hollowing out in the bottom of the cylinder. In the present application "bottom" has to be understood according to the sense of orientation of the discharge valve in the dispenser. Preferably the hollowing out is next to the base of the cylinder. According to an embodiment, the internal delivery tube can comprise a partial weir, preferably a half moon weir, obstructing the lower part of the circular tube in front of its hollowing-out.

The discharge port also comprises an external movable means. By external it is meant that this means surrounds the internal delivery tube delivering the ingredients form the container tank. This external means also comprises a hollowing out in its bottom part. This external means is movable so that according to its position its hollowing out can overlap or not the hollowing out of the delivery tube and consequently enable the opening or the closing of the discharge port for delivering ingredients. Preferably the external movable means is a cylinder.

According to the preferred embodiment a part of the external movable means is pushed by the internal face of the front door when said front door is closing. Consequently when the front door is closed, it maintains the movable external means in the position where the discharge port is opened.

According to the preferred embodiment the discharge port comprises at least one elastic member able to exert a force on the movable external means so as to push said means away from the container. The elastic member can be a spring or metal blades fixed on one end to the refillable container and cooperating on the other end with the external movable means. Preferably the elastic member can cooperate with pins on the lateral sides of the external movable means. Generally the elastic member exerts a force sufficient to displace the external movable means to a position in which its hollowing-out does not overlap the hollowing-out of the internal cylinder.

Depending on the size of the dispenser, it can comprise several sub-housings according to the present invention.

According to a specific embodiment the back wall of the sub-housing can comprise identification means cooperating with identification means of each of the canisters. Preferably these cooperating identification means are mechanical identification means like embossed and hollowed geometrical shapes.

According to a second aspect the invention concerns a method for refilling a beverage dispenser such as described here above and comprising the steps of:
 optionally unlocking the sub-housing,
 optionally rotating the discharge ports of the containers,
 pulling the sub-housing out of the housing,
 refilling the containers by the top.

BRIEF DESCRIPTION OF THE DRAWINGS

The characteristics and advantages of the invention will be better understood in relation to FIG. 1 depicts a perspective view of a beverage dispenser of the present invention in its operational state.

DETAILED DESCRIPTION OF THE DRAWINGS

Figure 1:
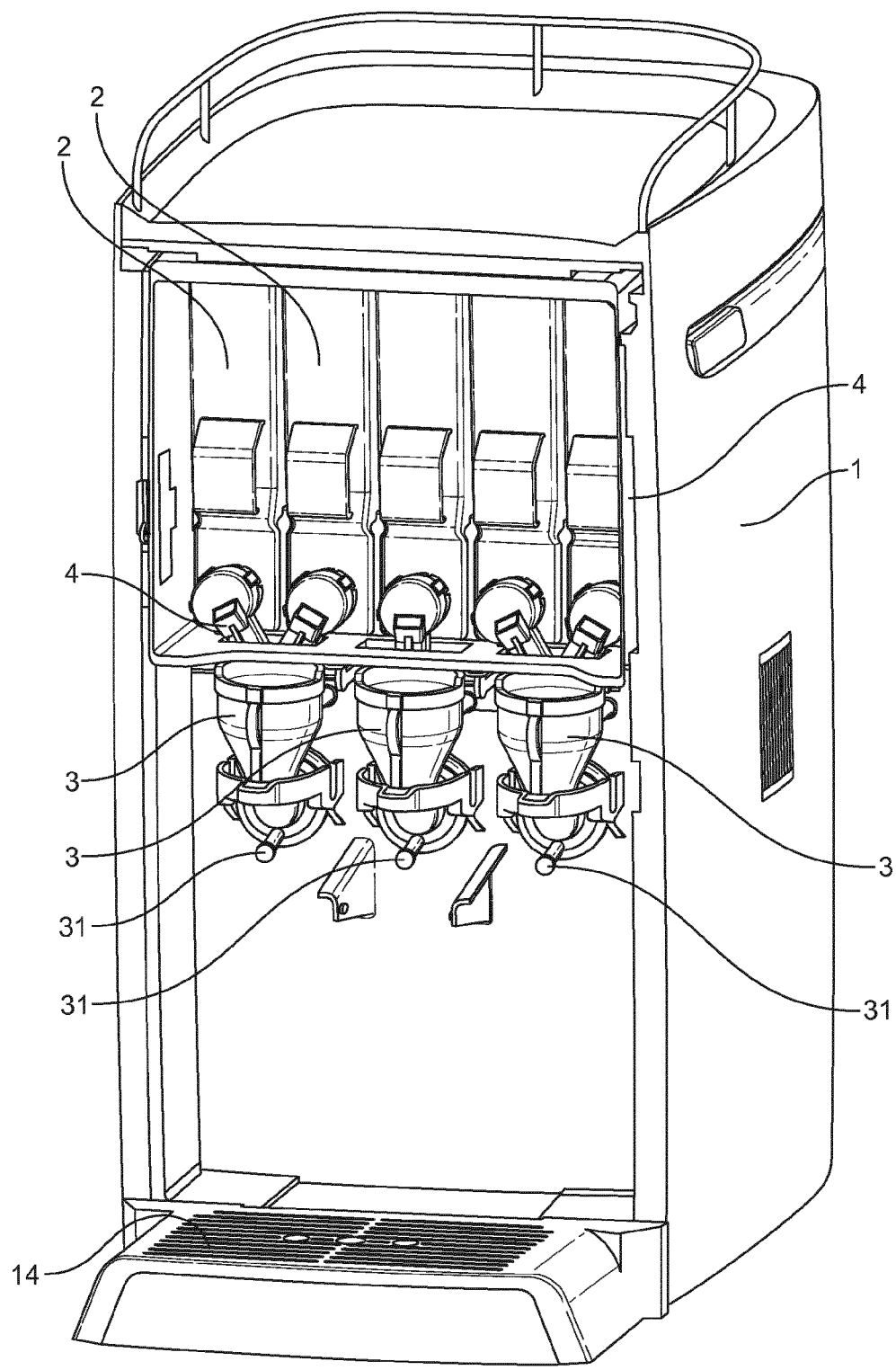

FIG. 1 illustrates a dispenser according to the present invention from which the front door has been made transparent for making its inside arrangement apparent. The dispenser comprises a housing 1 in which five containers 2 for storing bulk beverage ingredient are positioned. Each container presents a discharge port 6 at one extremity of the bottom of its tank. The discharge ports 6 are oriented so as to deliver the beverage ingredients to two units for contacting the beverage ingredients with a diluent. In the illustrated embodiment these units are whipping bowls yet any other mixing unit could be implemented. The outlets 31 of the whipper bowls deliver the beverage to the dispensing area 14 on which a recipient can be placed. Usually tubes are attached to the outlets 31 so as to lead the beverages to the dispensing area and the recipient. In its upper part the dispenser comprises a sub-housing 4 in which the five containers 2 are placed.

Figure 2A:
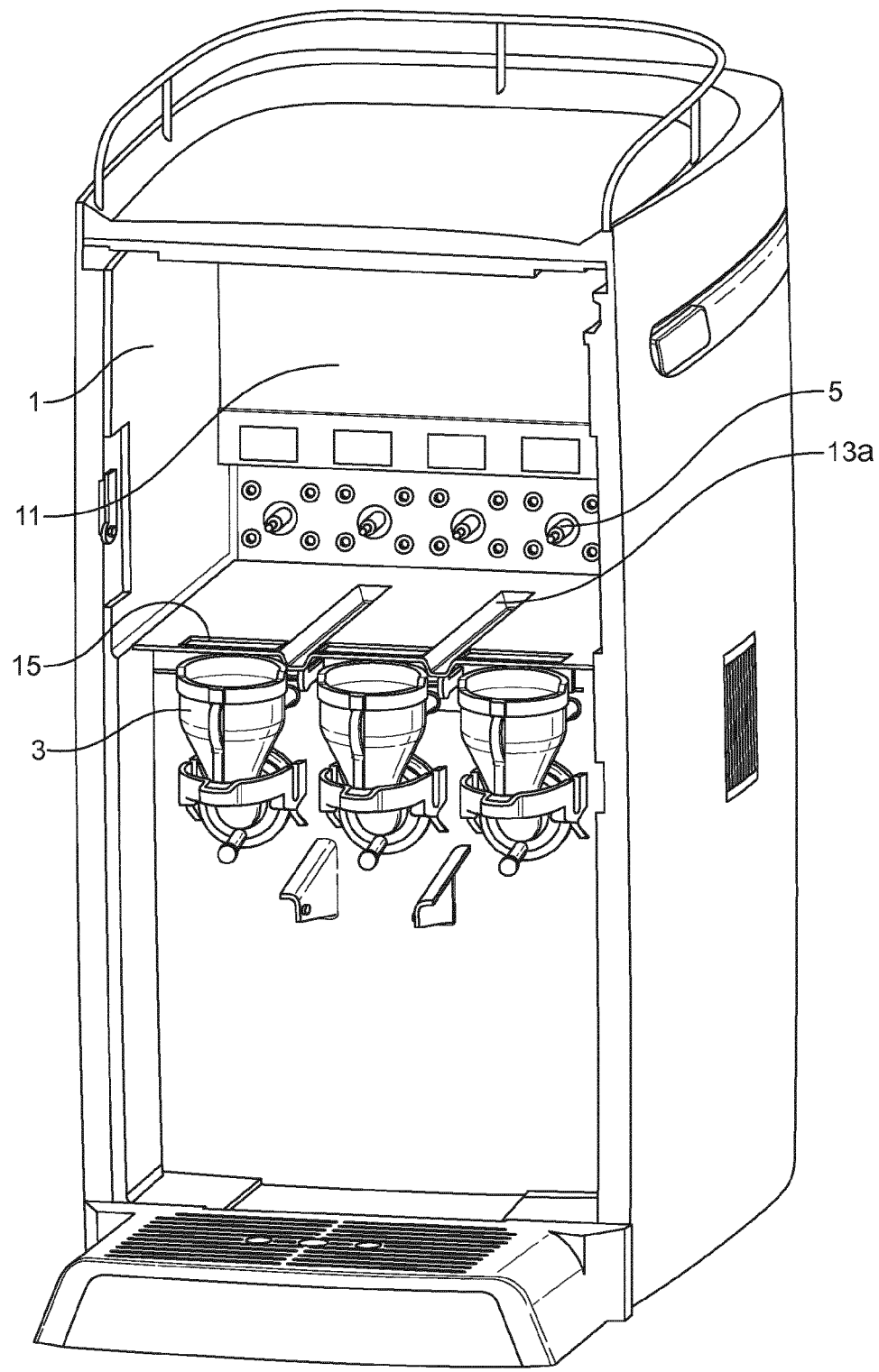
FIG. 2a depicts a perspective view of the beverage dispenser in its refilling state, the sub-housing being withdrawn from the housing.
Figure 2B:
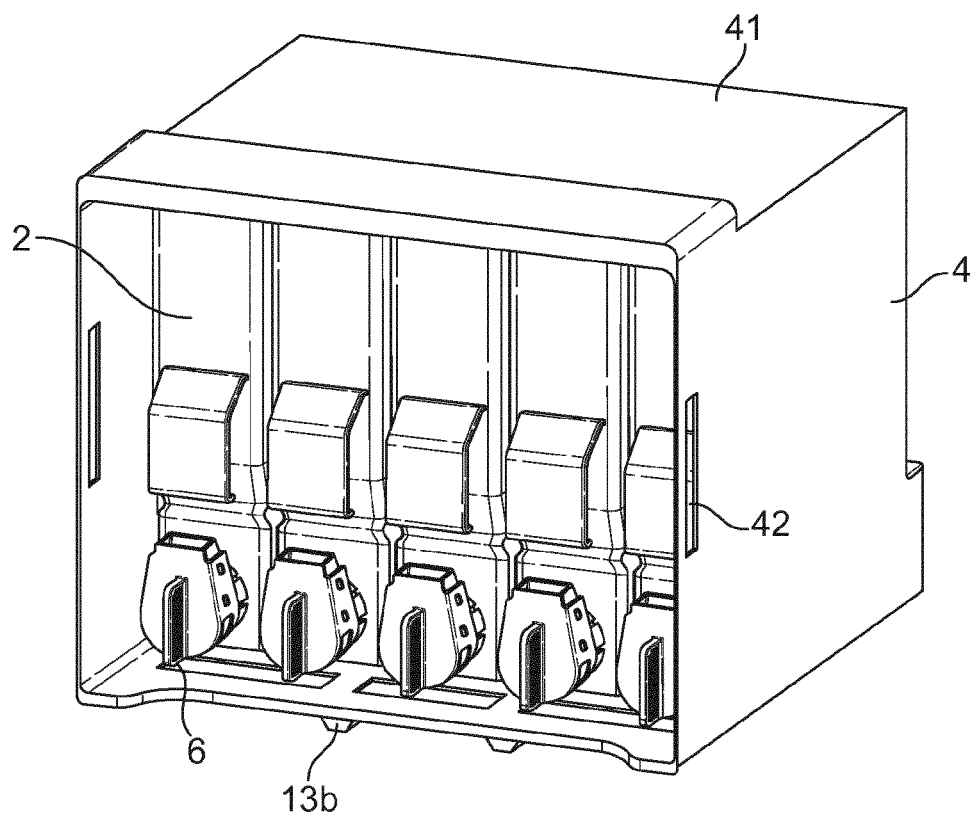
FIG. 2b depicts a perspective view of the sub-housing withdrawn from the housing.
Figure 3:
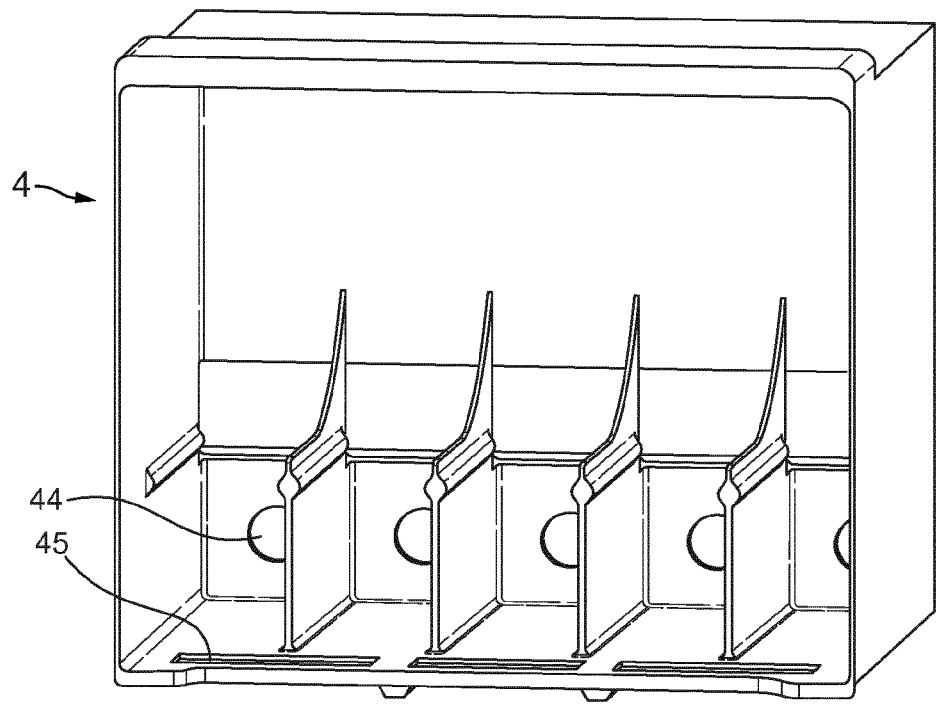
FIG. 3 is a perspective view of the sub-housing without the containers.

As illustrated in FIGS. 2a and 2b the sub-housing 4 is removable from the dispenser with the five containers 2 positioned in the sub-housing. The dispenser comprises a compartment 11 in which the sub-housing 4 can slide and be positioned. The sub-housing presents three longitudinal bumps 13b that can slide in two complementary slots 13a so as to guide the positioning of the sub-housing in the housing. Other type of guiding means on other surfaces of the housing and the sub-housing can be used to help the guiding during the operation of the placement of the sub-housing in the housing. The sub-housing 4 presents back wall apertures 44 so that the dosing means in the containers 2 can cooperate with actuating means in the back wall of the dispenser housing 1 as illustrated in FIG. 3. In the figures the dosing means in the containers 2 are screw or spring augers of which extremities are engaged by rotating shafts 5 such as shown in FIG. 2a. Optionally the sub-housing 4 can comprise two handles 42 on its lateral walls so that the operator can easily handle the sub-housing 4. The sub-housing 4 comprises three bottom holes 45 cooperating with three correspondent holes 15 in the compartment 11 of the dispenser so that when the sub-housing is in the dispenser the holes 15, 45 are facing each other. As illustrated in FIG. 1, during the operation state of the dispenser, the discharge ports 6 of the containers go through the holes 15, 45. Consequently for removing the sub-housing 4 with the containers 2 inside from the housing 1 the discharge ports 6 are rotated as illustrated in FIG. 2b so that they do not go through the holes 15, 45. The discharge ports 6 are also conceived so that their rotations actuate the closure of the tanks outlets. Then the operator cannot withdraw the sub-housing 4 with the containers 2 inside without having closed the discharge ports which guarantees a clean refilling operation. Once the operator has withdrawn the sub-housing from the dispenser, it can place it on a table where he has sufficient place to put the containers and refill them without mixing them.

Figure 4:
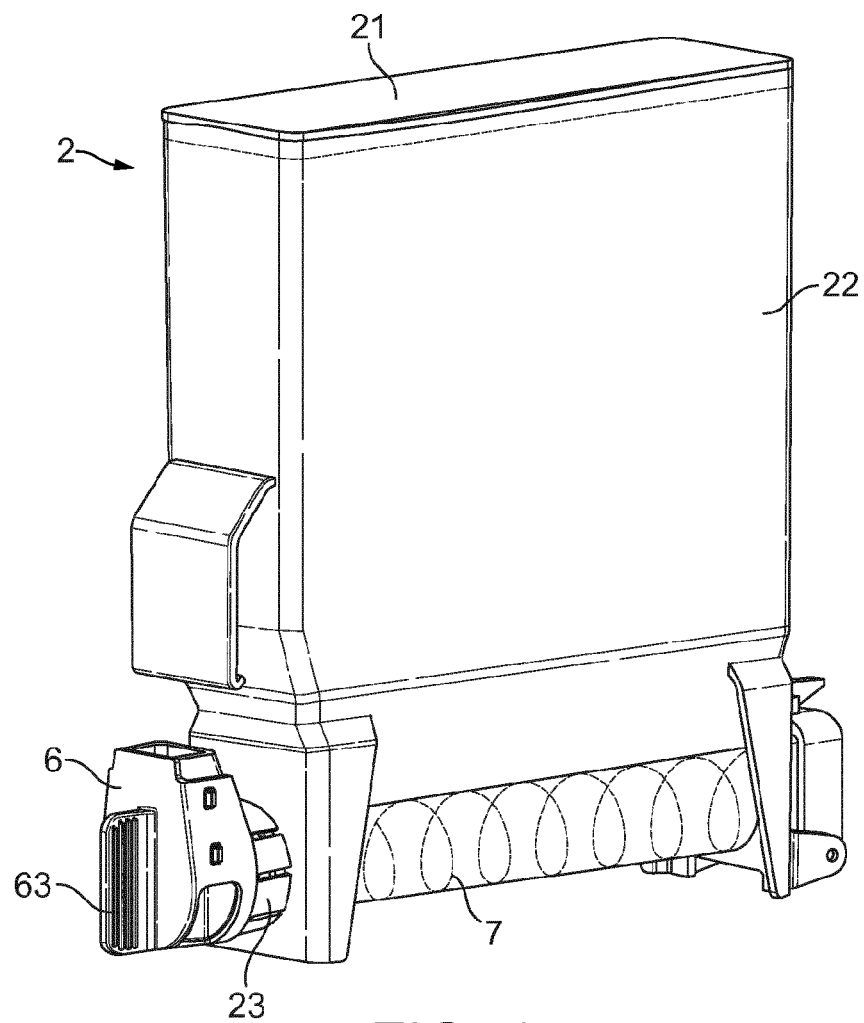
FIG. 4 is a perspective view of a container used in the dispenser of the present invention in its closed state.
Figure 5:
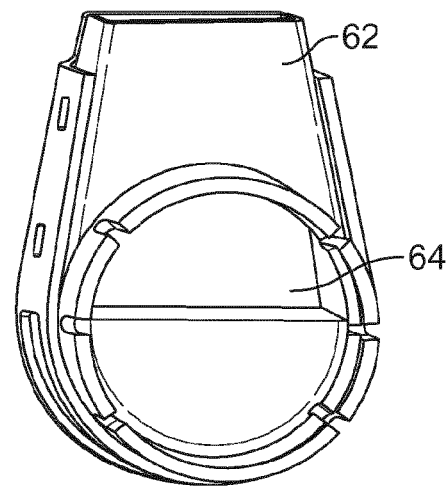
FIG. 5 is a perspective view of the discharge port of the container of FIG. 4.
Figure 6:
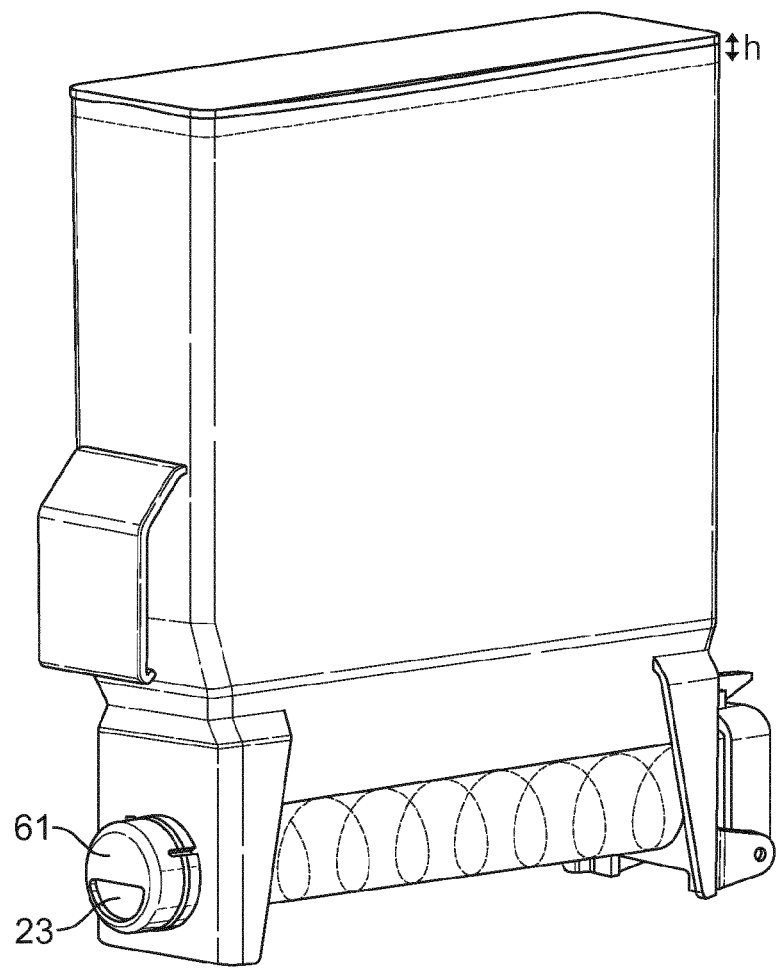
FIG. 6 is a perspective view of the container of FIG. 4 without the discharge port.
Figure 7:
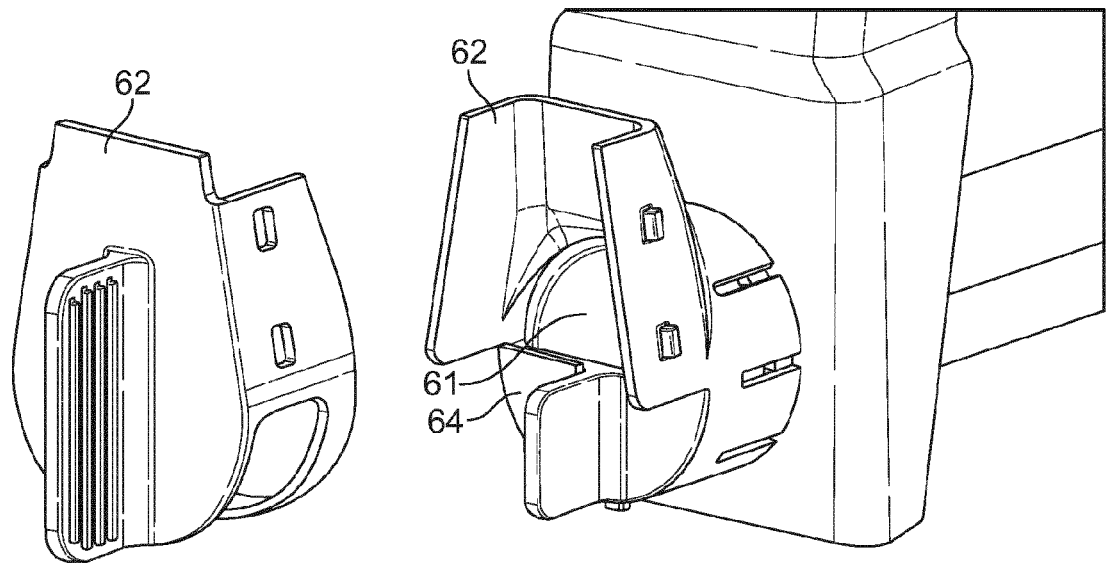
FIG. 7 is an exploded of the discharge port when it closes the container.
Figure 8:
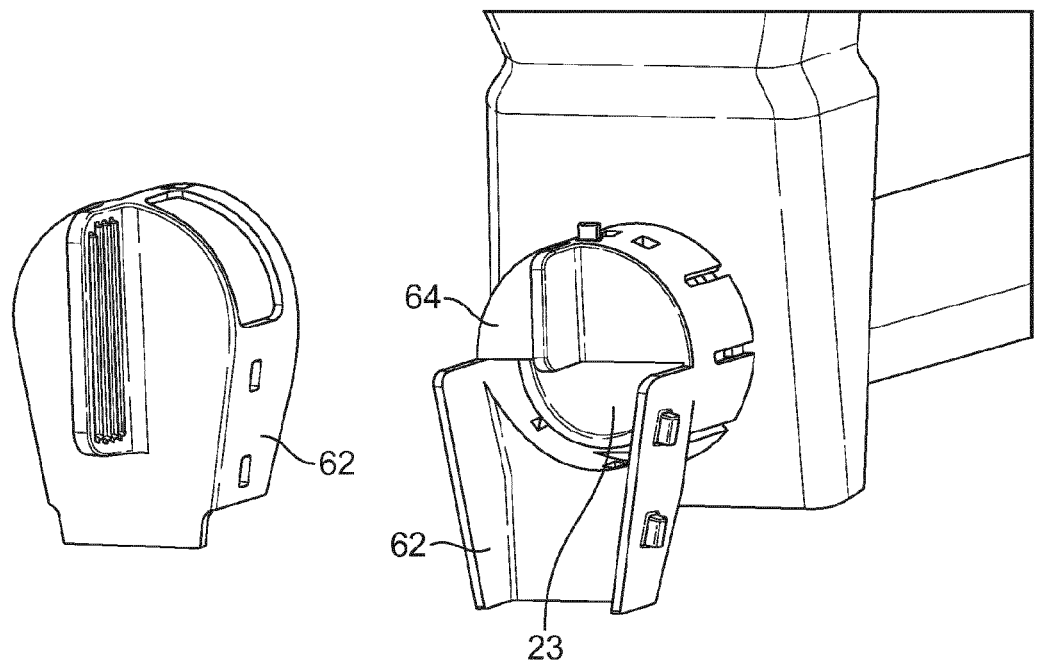
FIG. 8 is an exploded of the discharge port when it opens the container.

FIGS. 4, 5, 6 illustrate a refillable container 2 with a rotatable discharge port 6 according to the present invention. The container comprises a tank 22 in which the food ingredient is stored and closed at its top by a cover 21 for refilling. At its bottom it comprises a spring auger 7 illustrated in dotted lines which drives the bulk food ingredient to the tank outlet 23 and then to the discharge port 6. At the tank outlet the container comprises a half moon weir 61 obstructing the upper part of the circular outlet of the tank. The discharge port 6 is rotatable and comprises:

- a chute 62 that guides the beverage ingredient to the beverage preparation unit, and
- a half moon weir 64. Said weir 64 can either be set in front of the fixed half moon weir 61 (FIG. 8) or below it (FIG. 7) so as to respectively open or totally close the tank outlet 23. The chute 62 and the weir 64 are positioned one to the other so that when the chute is oriented downward the weir 64 is in front of the fixed half moon weir 61 (FIG. 8)—and the discharge port is open—and when the chute is oriented upward the weir 64 is below the fixed half moon weir 61 (FIG. 7)—and the discharge port is closed. The discharge port can comprise a handle 63 to help the rotation.

When the operator wants to refill the containers 2, he opens the dispenser and rotates the discharge port 6 upward so a simultaneously close the outlet of the containers 2 and liberate the discharge ports 6 from the holes 15 in the housing. Then he pulls the sub-housing 4 removing all the five canisters 4 together from the housing 1. He is able to place the sub-housing 1 on a table and, he can refill each container 4 by pulling it out of the sub-housing 4, opening its cover and emptying a beverage ingredient inside. Once each container is refilled and replaced in the sub-housing 4, he places the sub-housing back in the housing 1 of the dispenser; for the positioning of the sub-housing he is guided by the bumps at the bottom of the sub-housing that must slide in the corresponding slots of compartment 11 in the housing. Then the operator opens the container by rotating the discharge ports 6 downwards.

Figure 9:
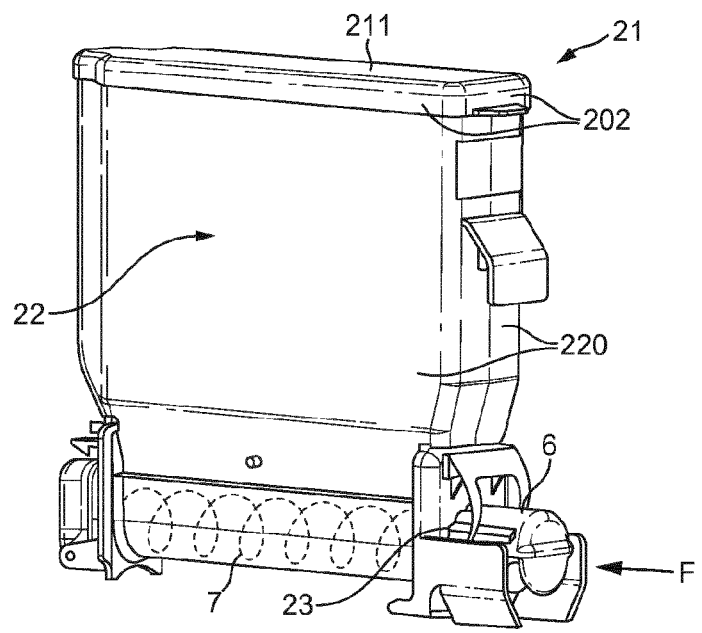
FIG. 9 depicts a perspective view of one of the refillable containers that could be alternatively used in the dispenser of FIG. 1.
Figure 10:
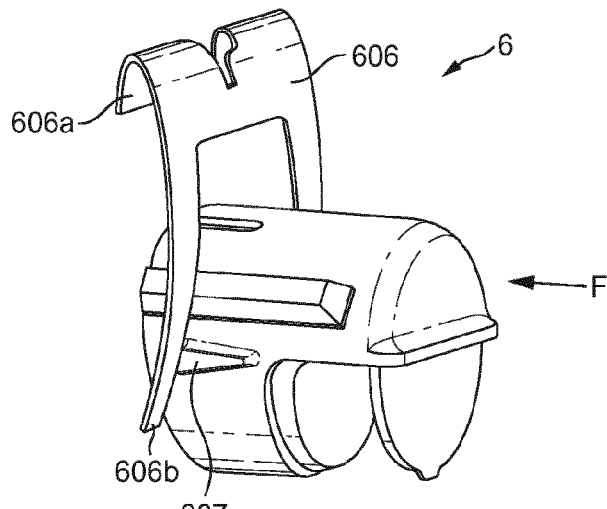
FIG. 10 depicts a perspective view of the discharge port of the container of FIG. 9.
Figure 11:
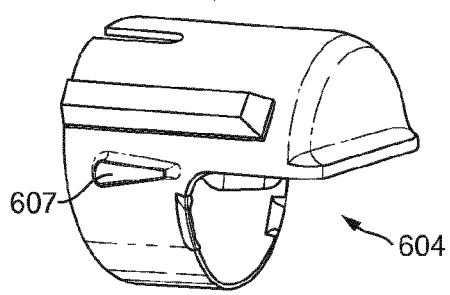
FIGS. 11 and 12 depict two perspective views of the internal and external parts of the discharge port of FIG. 10.
Figure 12:
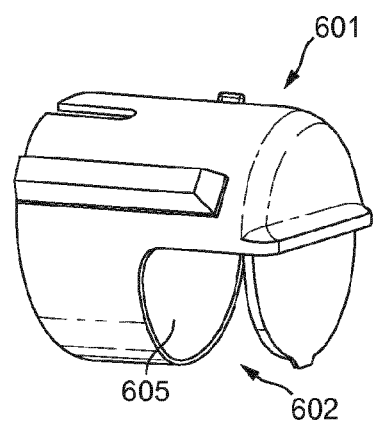

FIG. 9 illustrates a refillable container 2 with a discharge port 6 according to the present invention. The container comprises a tank 22 in which the food ingredient is stored and closed at its top by a cover 21 for refilling. At its internal bottom it comprises a spring auger 7 illustrated in dotted lines which drives the bulk food ingredient to the tank outlet 23 and then to the discharge port 6. As illustrated in FIGS. 10, 11 and 12 the discharge port 6 comprises:

- an internal delivery tube 601 comprising a hollowing-out 602 in its bottom part,
- external movable means 603 comprising a hollowing-out 604 in its bottom part. When assembled, the external movable means 603 covers at least a part of the internal delivery tube 601. The hollowing-outs 602, 604 are configured so that they can overlap each other or not. The external movable means 603 presents pins 607 on its lateral sides for cooperating with the end of flexible blades 606 attached by their other end 606a to the wall of the container tank. The flexible blades exert a force on the movable means 603 so as to push said means away from the container that is in a direction corresponding to the opening direction of the front door.

Due to the movable capacity of the external movable means 603, this means can move between:

a position in which its hollowing-out 604 overlaps the hollowing-out 602 of the internal delivery tube, and a position in which the surface of the external movable means 603 overlaps and closes the hollowing-out 602 of the delivery tube.

Figure 13:
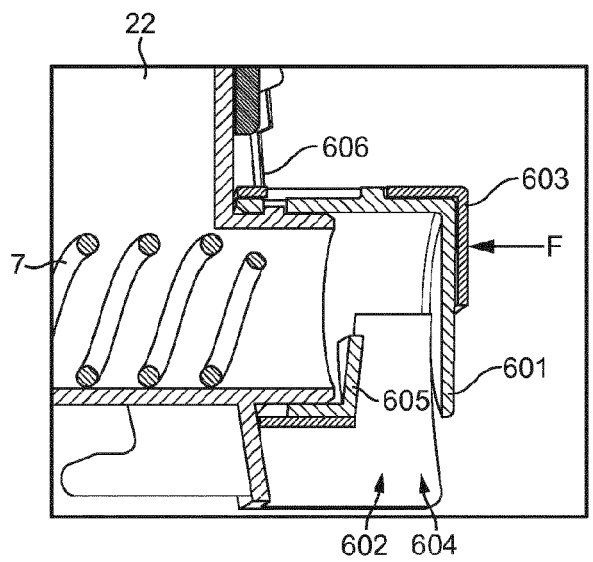
FIG. 13 is a cross section view of the discharge port of FIG. 10 in its opened configuration.

In FIGS. 9, 10 and 13 the external movable means 603 is in a position where the front door (not illustrated) is in contact with the end of the external movable means 603 and exerts a force F on it, pushing it against the force of the flexible arms 606 so that the hollowing out 604 of the external movable means 603 overlaps the hollowing-out 602 of the delivery tube. In this position the ingredient can be delivered form the container 2 inside a preparation unit 3.

Figure 14:
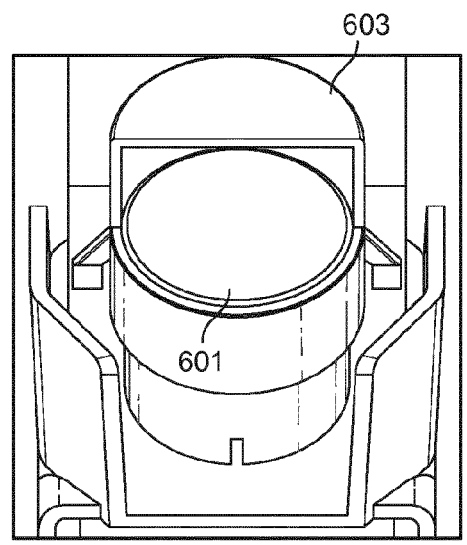
FIG. 14 is a perspective view from the bottom of the discharge port of the container of FIG. 9 in its closed configuration.
Figure 15:
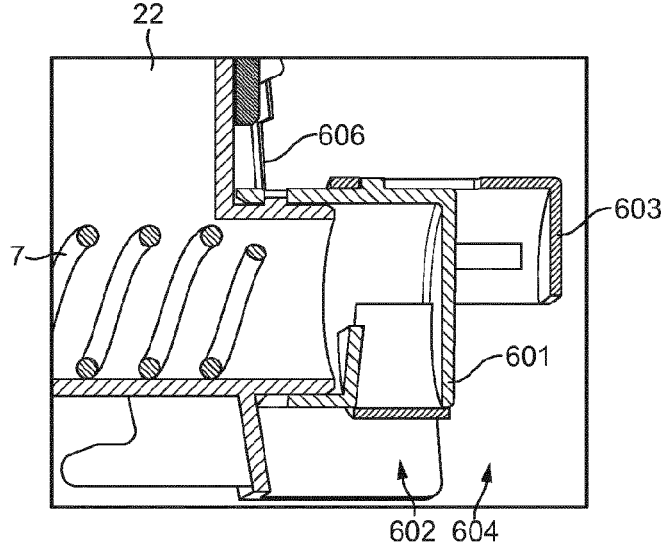
FIG. 15 is cross section view of the discharge port of FIG. 14 in its closed configuration.

If the front door is opened, no force acts anymore on the end of the external movable means 603 against the force of the flexible blades as illustrated in FIGS. 14 and 15. Consequently these blades are free to push the external movable means 603 according to their elastic force and to make it slide around the internal delivery tube 601 so that the hollowing-out 604 of the external movable means does not overlap anymore the hollowing-out 602 of the delivery tube and so that the discharge port 6 is closed.

Figure 16:
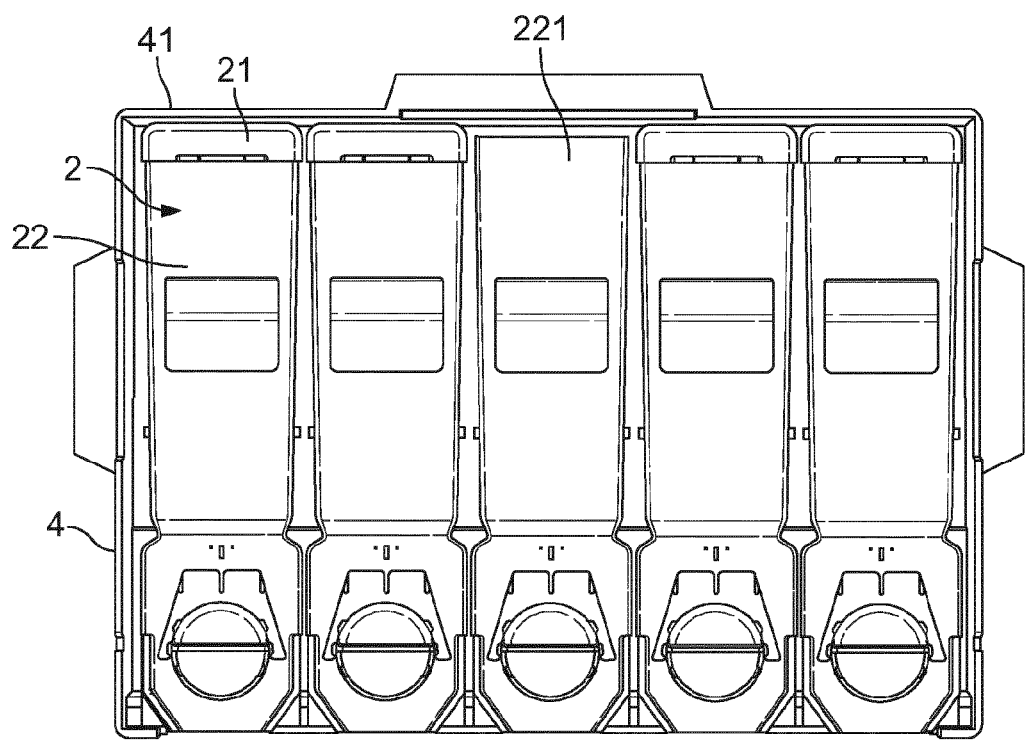
FIG. 16 is a front view of the sub-housing that has been withdrawn from the dispenser housing and in which one container cover has been made transparent.
Figure 17:
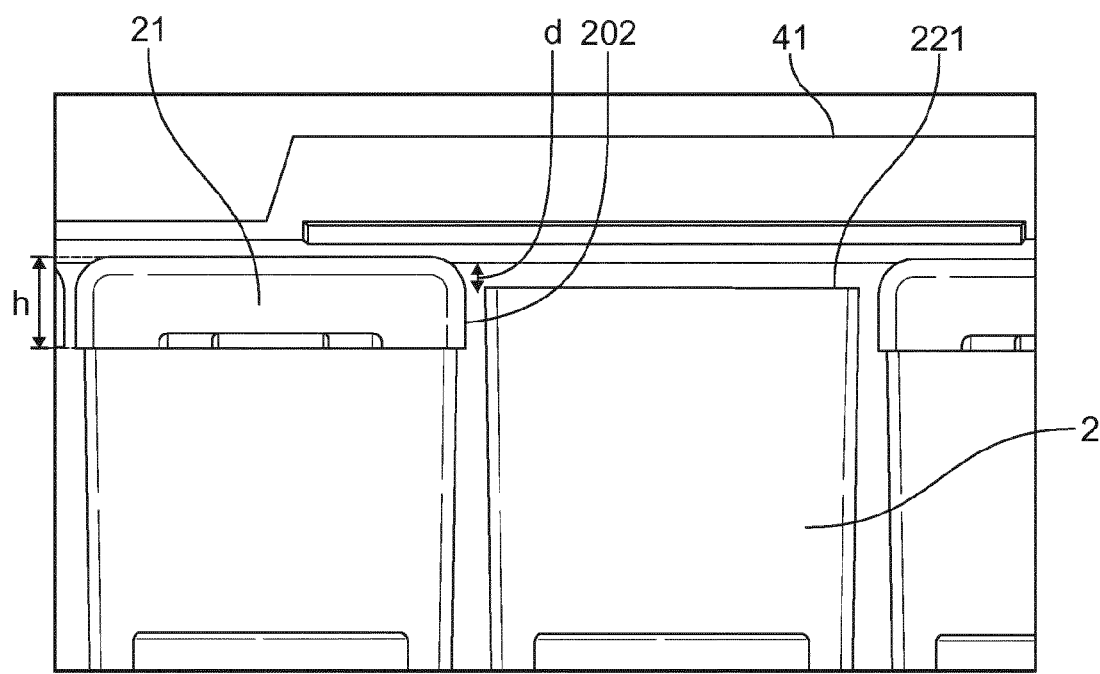
FIG. 17 is a magnified view of FIG. 16.
Figure 18:
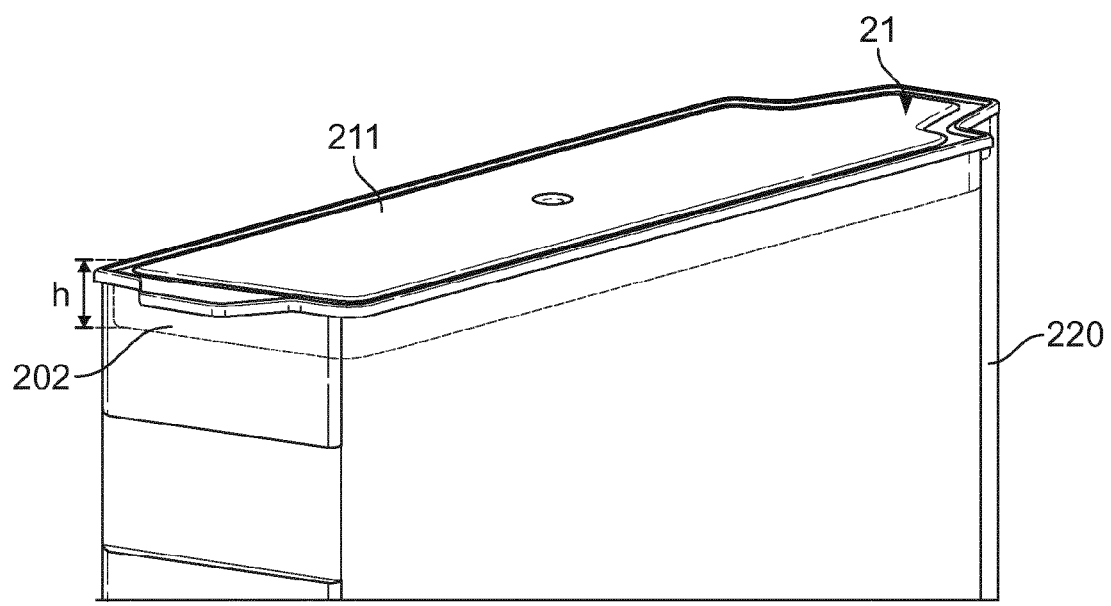
FIG. 18 illustrates a variant for the cover of the container of FIG. 9.

FIG. 16 illustrates a sub-housing 4 which has been removed from the dispenser with the five refillable containers 2 positioned in the sub-housing. Each container 2 comprises a tank 22 and a cover 21. For a better understanding of the invention, one of the containers has been represented without its cover. As magnified in FIG. 17, when the refillable container is placed in the sub-housing 4, the top of the tank 221 is at a distance d from the sub-housing top 41. As illustrated in FIG. 9 each cover 21 of the containers 2 comprises a lid 211 and four walls 202 perpendicular to the lid, said walls being configured to slide along the tank walls 220. The four walls 202 present a height h greater than the distance d. Consequently if the sub-housing is not oriented according to its current use, e.g. if it falls and is turned upside down during handling, the covers would still close the tanks openings and no bulk ingredients would escape. FIG. 18 illustrates a variant of the cover illustrates in FIGS. 9, 16 and 17 where the four walls 202 of the cover that are perpendicular to the lid 211 are configured for internally sliding along the tank walls 220, whereas in FIGS. 9, 16 and 17, these four walls are configured for externally sliding along the tank walls 220. The terms "externally" and "internally" refer to the volume defined by the tank.

Figure 19:
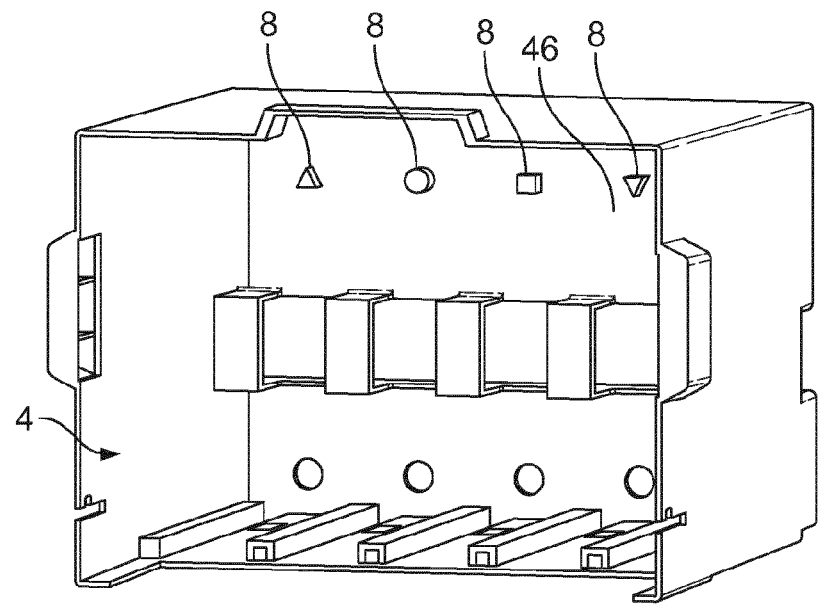
FIGS. 19 and 20 illustrate a sub-housing and a refillable container presenting cooperating identification means.
Figure 20:
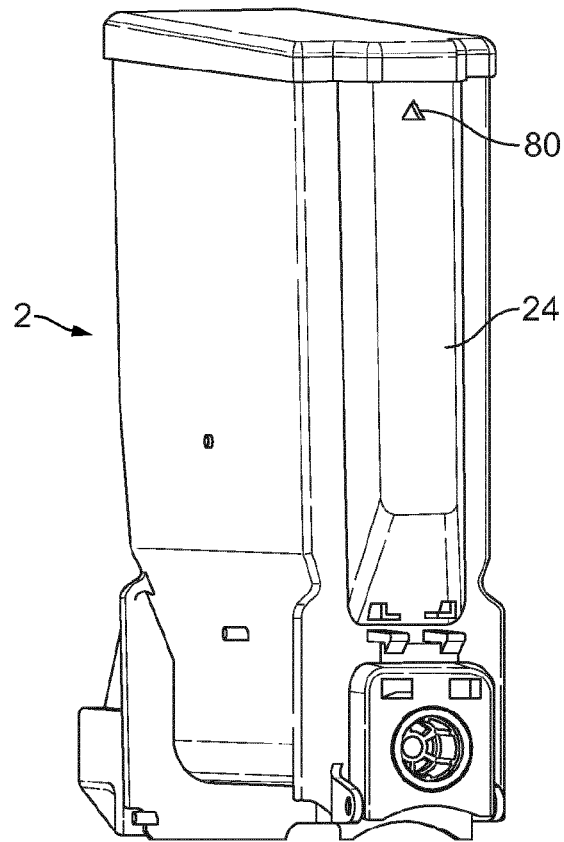

FIG. 19 illustrates an empty sub-housing 4 of which back wall 46 comprises 4 different identification means 8 in the form of 4 different geometrical shapes embossed in the back wall. FIG. 20 is a back view of a refillable container 2 presenting an identification means 80 hollowed in the back side of the container and cooperating with one of the identification means 8 of the back wall of the sub-housing. Thanks to these different identification means the risk that the operator mixes the different container during refilling and does not associate the good bulk ingredient with the good beverage preparation unit is decreased.

An advantage of the present invention is that the operator can rapidly refill all the containers since he does not have to repeat the movement of unloading each container from the dispenser: in the one movement he is able to remove all the containers.

Another advantage of the present invention is that the refill can be made without powder dirtying the machine and without cross contamination between the containers.

The invention claimed is:

1. Beverage dispenser comprising:
   a housing;
   at least two refillable containers for storing bulk beverage ingredients;
   at least a beverage preparation unit operatively linked to the containers for preparing a beverage from at least one of the stored bulk beverage ingredients; and
   a sub-housing in which the containers are placed, the sub-housing being removable from the housing,
   wherein top of the sub-housing is configured to close access to top of the containers, and
   each refillable container comprises a cover and a tank, the cover comprising a lid and four walls perpendicular to the lid, the walls being configured to slide along walls of the tank, and height of the four walls is greater than distance between top of the tank of the container and the top of the sub-housing.

2. Beverage dispenser according to claim 1, wherein the sub-housing is a drawer.

3. Beverage dispenser according to claim 1, wherein the sub-housing is able to slide in the housing.

4. Beverage dispenser according to claim 1, wherein the sub-housing comprises handles on lateral walls thereof.

5. Beverage dispenser according to claim 1, wherein the sub-housing comprises a guide complementary to a housing guide and configured for guiding positioning of the sub-housing in the housing.

6. Beverage dispenser according to claim 1, wherein the sub-housing comprises holes enabling the cooperation of an auger positioned in the containers with rotating shaft positioned in the dispenser.

7. Beverage dispenser according to claim 1, wherein each of the containers comprises:
   a tank,
   a rotatable volumetric auger at a bottom of the tank, and
   a discharge port at an outlet of the tank.

8. Beverage dispenser according to claim 1, wherein the discharge port is able to rotate.

9. Beverage dispenser according to claim 8, wherein the rotation of the discharge port actuates closure of an outlet of the tank.

10. Beverage dispenser according to claim 1, wherein the tank comprises a half moon weir obstructing an upper part of a circular outlet of the tank and the rotatable discharge port comprises a chute able to guide the beverage ingredient to the beverage preparation unit, and the half moon weir.

11. Beverage dispenser according to claim 10, wherein the rotatable discharge port is configured so that the half moon weir thereof obstructs the upper part of the outlet of the tank when the chute is rotated upward.

12. Beverage dispenser according to claim 1, wherein back wall of the sub-housing comprises an identification member cooperating with an identification member of each of the containers.

13. Beverage dispenser according to claim 7, wherein the sub-housing comprises holes that face corresponding holes in the dispenser when the sub-housing is in the dispenser, and the discharge port rotates between (i) a dispensing position in which the discharge port extends through a pair of holes and (ii) a container removal position in which the discharge port extends in an opposite direction relative to the dispensing position, does not extend through the pair of holes, and closes the outlet of the tank.

14. Method for refilling a beverage dispenser that comprises: a housing, at least two refillable containers for storing bulk beverage ingredients, at least a beverage preparation unit operatively linked to the containers for preparing a beverage from at least one of the stored bulk beverage ingredients, a sub-housing in which the containers are placed, the sub-housing being removable from the housing, wherein top of the sub-housing is configured to close access to top of the containers, and each refillable container comprises a cover and a tank, the cover comprising a lid and four walls perpendicular to the lid, the four walls being configured to slide along walls of the tank, and height of the four walls is greater than distance between top of the tank of the container and the top of the sub-housing, the method comprising:

unlocking the sub-housing;
   rotating discharge ports of the containers;
   pulling the sub-housing out of the housing; and
   refilling the containers by the top.

15. Method according to claim 14, wherein the sub-housing comprises holes that face corresponding holes in the dispenser when the sub-housing is in the dispenser, and each discharge port is rotated between (i) a dispensing position in which the discharge port extend through a pair of holes and (ii) a container removal position in which the discharge port extends in an opposite direction relative to the dispensing position, does not extend through the pair of holes, and closes an outlet of the tank.

\* \* \* \* \*